July 7, 1964 L. GRYK 3,140,044

RECORD PERFORATING APPARATUS

Filed June 1, 1962 4 Sheets-Sheet 1

INVENTOR
LEON GRYK
BY Thomas S. Ross
Joseph R. Spalla
ATTORNEYS

INVENTOR
LEON GRYK
BY Thomas S. Ross
Joseph R. Spalla
ATTORNEYS

July 7, 1964 L. GRYK 3,140,044

RECORD PERFORATING APPARATUS

Filed June 1, 1962 4 Sheets-Sheet 3

INVENTOR
LEON GRYK

BY Thomas S. Ross
Joseph R. Spalla
ATTORNEYS

July 7, 1964

L. GRYK 3,140,044

RECORD PERFORATING APPARATUS

Filed June 1, 1962

4 Sheets-Sheet 4

INVENTOR
LEON GRYK

BY Thomas S. Ross
Joseph R. Spalla
ATTORNEYS

United States Patent Office 3,140,044

Patented July 7, 1964

3,140,044

RECORD PERFORATING APPARATUS

Leon Gryk, New Britain, Conn., assignor to Royal McBee Corporation, New York, N.Y., a corporation of New York Filed June 1, 1962, Ser. No. 199,510

7 Claims. (Cl. 234—119)

This invention relates to record perforating apparatus; more particularly it relates to record perforating apparatus operative to process code signals in response to start process signals issued by a system with which it is to function and operative in turn to emit IN process signals to the system thereby to control the issuance of subsequent start process signals whereby subsequent code signals may be processed; and specifically it relates to a free running record perforating apparatus characterized by control circuitry operable in response to start process signals and to signals generated internally at its free running rate to effect the processing of code signals.

Data processing systems presently known generally include input or source units in the form of keyboards, record readers or computers, and output or slave units in the form of printers, recorders, and computers.

In accordance with a system which is generally illustrated in FIGURE 1 and in which the instant apparatus may be employed, all the source units 6 have their data outputs connected to a common buffer storage unit 7 while all the slave units 8 have their known data inputs connected to the output of said buffer storage units. The buffer storage unit is connected to system timing and control circuitry 9 as are the input and output control lines from the source and slave units. The selective connection of a source unit with one or more slave units is effected by the system control circuitry 9 in response to control code signals issued by a program source. More specifically control code signals issued by a program source and stored in unit 7 are translated in the system control circuitry whereby selected source and slave units are turned on and whereby a start search signal is issued to the selected source unit. The selected source 6, e.g. a reader, upon receipt of a start search signal from the system timing and control circuitry emits a search complete signal to the system control circuitry, and code signals representative of data information to the buffer storage unit wherein the information is stored until the buffers are reset. As stated the output of the buffer unit is connected to the slave units, e.g. a perforating unit, over lines 11. In response to the search complete signal the system control circuitry generates a start process signal on line 12 which permits as will hereinafter appear the slave unit to process the data stored in the buffers. After the slave unit has processed the data it causes an in process signal to issue over a slave in process line 13 which is effective in the system control circuitry to initiate another source command or start search signal and to reset the buffer storage unit whereby subsequent data issued by the selected source unit may be processed by the slave unit. The processing of data between selected source and slave continues until the selected source emits control information effective in the system control circuitry to return control to the program source which may itself act as the source in charge or select another source and slave or slave units.

As is apparent each source and slave unit operates on a two line basis. In the case of a slave one line causes the unit to process data while the other line informs that it has processed the data and is ready to process subsequent data. The present invention provides such a slave unit in the form of a record perforating unit which is free running at a 50 per second basic operating rate. Since it is free running it is provided in accordance with the invention with its own unit control circuitry which automatically synchronizes the free running mechanical cycle with the start process signals in that it is operable, in response to start process signals and to signals generated at its free running rate, to effect the perforation of code signals in and movement of a record.

An object of the invention is in the provision of a record perforating apparatus having a basic free running rate which may be operated with a free running source generating data at any constant rate.

Another object of the invention is in the provision of a record perforating apparatus having a basic free running rate which is operable in response to signals aperiodically generated by a source having a slower operating rate.

Another object of the invention is in the provision of a record perforating apparatus having a free running rate which processes data in response to command signals and which issue signals indicative of the fact that the data has been processed.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
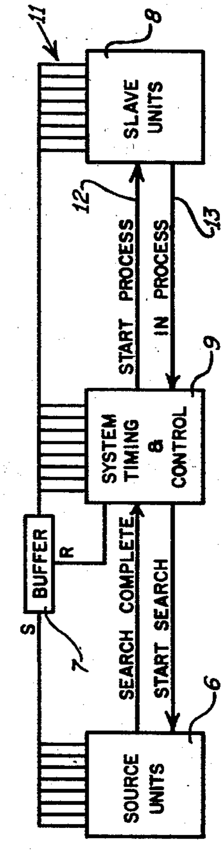
FIGURE 1 is a logic block diagram of a data processing system.

As stated with reference to FIGURE 1 the record perforating apparatus is operable to process data delivered thereto over code lines 11 in response to a start process signal on line 12 and to apprise a system when it has completed processing the data over the slave in process line 13. In the system briefly described in FIGURE 1, the in process signal on line 13 is effective in the system control circuitry to automatically cause the selected source unit, when it is a free running reader that generates data at a constant rate, or to permit the selected source unit, when it is a keyboard, to issue subsequent code signals and a search complete signal, the latter initiating start process signals. Whenever the source rate then the free running perforating apparatus will automatically accommodate itself thereto.

The present apparatus need not be free running but rather could be cycled in response to aperiodically applied clutch signals. In such an application, as when the apparatus is operable from a keyboard, the mechanical cycle will always be in synchronization with the source.

Figure 2:
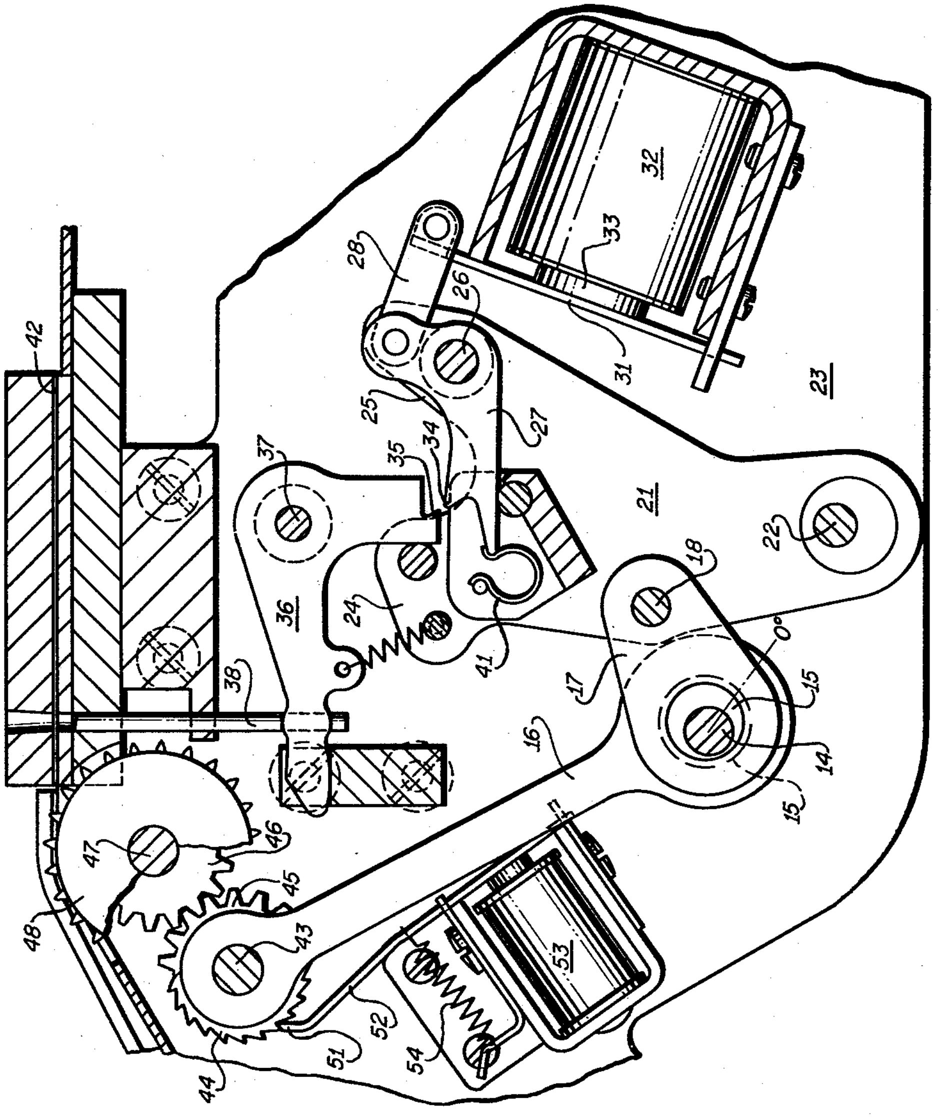
FIGURE 2 is an elevational view showing mechanical elements of record perforating apparatus.

Referring now to FIGURE 2 the mechanical elements of the record perforating apparatus comprises a shaft 14 which is preferably continuously driven at a 50 per second rate but may be coupled to a drive source operable at a 50 per second rate in response to periodically or aperiodically applied clutch signals as noted above. The shaft carries circular cams 15 eccentrically mounted thereon and adapted to drive a feed drive arm 16 and a punch drive arm 17 respectively. The punch drive arm is pivotally connected to a rod 18 secured to and between horizontally spaced plate members 21 which are pivotally mounted at their lower extremities on a common fulcrum shaft 22 secured between spaced frame members 23. Rotation of shaft 14 then will cause plate members 21 to rock between right and left limits. The bifurcated upper extremities of each plate member comprises a leftwardly extending arm 24 and a rightwardly extending arm 25 as viewed in the figure. The rightwardly extending arms have secured between them a pawl support rod 26 on which a plurality of pawls 27 are pivotally mounted. Each pawl is articulately connected by a link 28 to the armature 31 of a punch selector electromagnet 32 which, if fully energized when the plate members reach their right limit, will cause the armature 31 to be held against its associated pole piece 33 thereby effecting the clockwise rotation of the pawl as the plate members 21 are driven toward their left limit. Each pawl 27 is provided with a tooth 34 adapted to engage a complementary tooth 35 on a bell crank 36 which is pivotally mounted on a comomn cross shaft 37 and which carries a record punch element 38. When a pawl 27 has rotated through a predetermined arc under the action of the plate members 21 and the restraining influence of the pole piece 33 on the armature 31 associated therewith, it is committed by an associated overcentering spring 41 into engagement with and thereafter drives its associated bell crank 36, whereby the punch element 38 is driven into a channel 42 through which a record medium travels. Further details of the structure shown in FIGURE 2 are more particularly described in copending application of Donald G. Hebert, Serial No. 178,779, now Patent 3,100,599.

The record feed mechanism is as described in Patent 3,036,474 issued to G. Perez. Briefly, the extremity of the feed drive arm 16 carries a stub shaft 43 on which is rotatably mounted a ratchet 44 and a drive gear 45 affixed thereto. The drive gear 45 meshes with a gear 46 on the shaft 47 of a sprocketed record feed drum 48. The ratchet 44 is associated with the nose 51 of an armature 52 of a forward feed electromagnet 53 which is normally not energized such that the nose of the armature is retracted by a spring 54 out of engagement with the ratchet 44. The rotation of drive shaft 14 then will oscillate the feed drive arm 16 between upper and lower limits such that the drive gear 45 will roll about gear 46. If however the forward feed electromagnet 53 is fully energized when the feed drive arm reaches its uppermost position the armature nose engages the ratchet 44, whereby during the downward movement of arm 16 from its upper limit position, the ratchet and drive gear 45 will pivot about the nose 51 of the armature thereby to drive the gear 46 on the feed sprocket drum 48 one increment. Shaft 43 also carries a reverse feed ratchet (not shown) which in association with a reverse feed electromagnet 55 (FIGURE 3) and armature is operable by feed drive arm 16 to effect reverse feed; the timing being such that reverse feed occurs 180 degrees out of phase from forward feed as will hereinafter appear.

Figure 4:
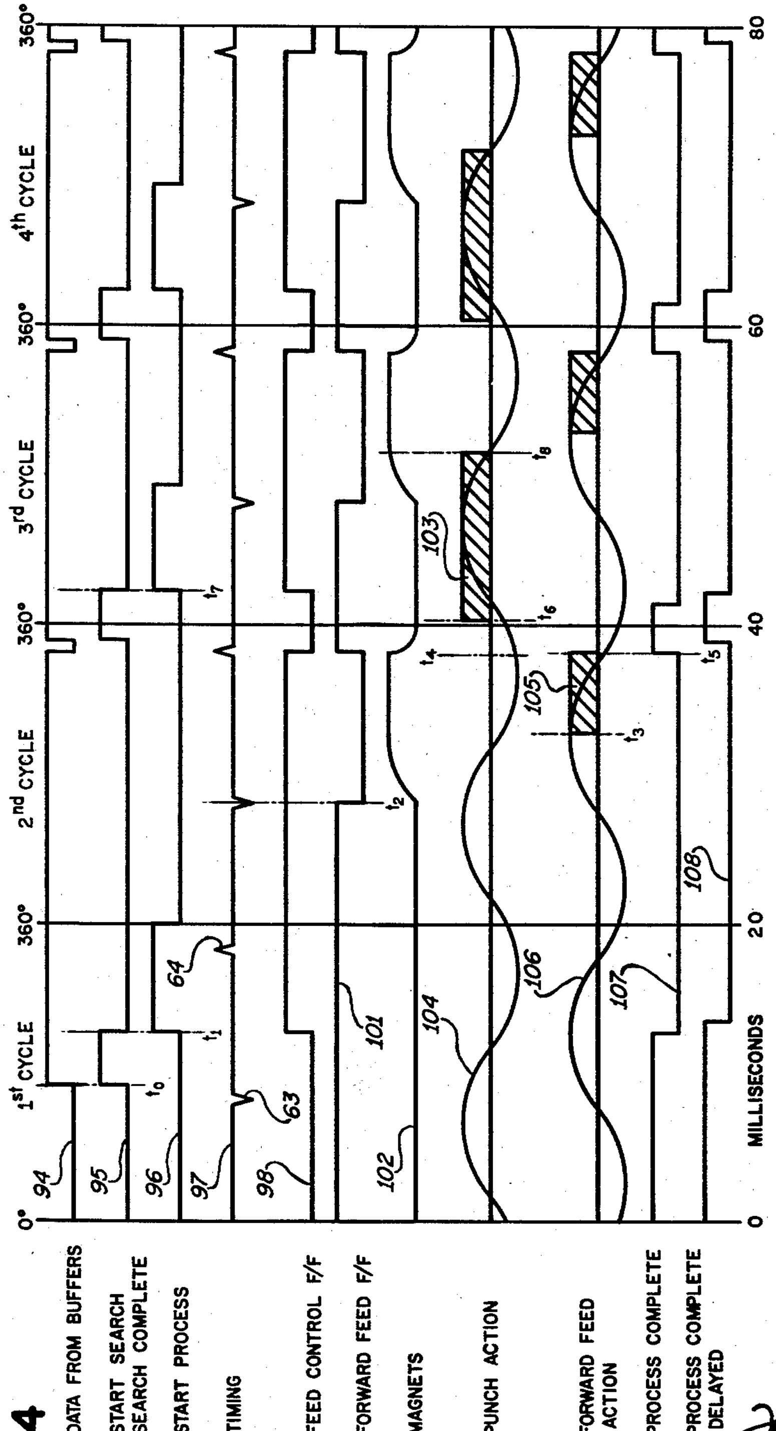
FIGURE 4 are timing diagrams.
Figure 3:
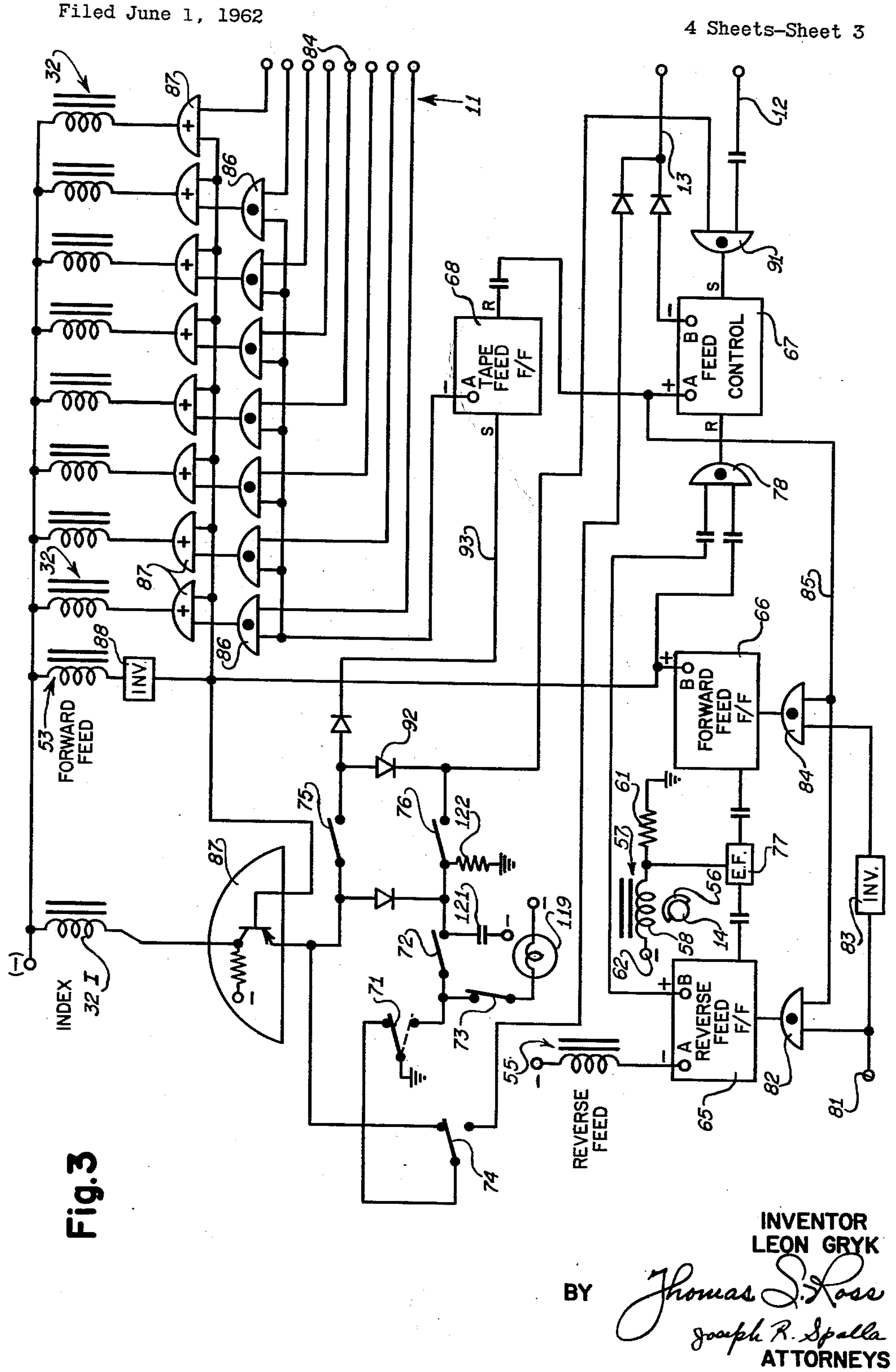
FIGURE 3 is a block schematic diagram of the electrical elements of the record perforating apparatus.

As shown in FIGURE 3 the drive shaft 14 further carries a flux concentrating element 56 which takes, in the embodiment disclosed, the form of a semicircle. The element 56 is operatively associated with the core of an electromagnet 57. The coil 58 of the electromagnet is connected in series with a resistor 61 and both are connected between ground and a negative D.C. source terminal 62. As is understood in the art element 56 will act to concentrate and diminish the flux in the electromagnet core each shaft cycle thereby inducing negative and positive timing pulses 63 and 64 (FIGURE 4) in the coil circuit. The orientation of the cams 15 on the shaft 14 are such that when the shaft 14 rotates 120 degrees the plate members 21 are at their left limit and when the shaft reaches 300 degrees (the position shown) they are at their right limit. Similarly when the drive shaft 14 rotates 45 degrees the feed drive arm 16 is at its lowermost position and when the shaft rotates to 225 degrees it is at its uppermost position. In the embodiment disclosed herein the flux concentrating element 56 of the timing pulse generator is oriented such that negative or set pulses as will hereinafter appear occur in time such that the forward feed electromagnet 53 will have sufficient time to pull in its armature before the feed drive arm reaches its uppermost position and such that selected punch selector electromagnets 32 can generate peak flux before the plate members 21 reach their rightmost position. The positive or reset pulse occurs after punches have been committed. More particularly the negative and positive pulses which serve as set and reset pulses during forward feed are shown in FIGURE 4 as occurring at 145 and 325 degrees of shaft rotation. During reverse feed the positive and negative pulses serve as set and reset pulses.

Referring particularly now to FIGURE 3 there is shown the perforating apparatus control circuitry including the punch selecting electromagnets 32 and the forward and reverse feed electromagnets 53 and 55 respectively. The control circuitry comprises four transistor flip flop circuits of conventional design; a reverse feed 65, forward feed 66, feed control 67 and tape feed flip flop 68. The circuitry also comprises in the embodiment disclosed a card detector, card in position, and card zone switches 71, 72 and 73 respectively, which assume the normal positions shown when tape is the record medium. The circuitry also includes a tape tension switch 74 which is shown in a normal or no tape tension position, and manually operable tape feed and card eject switches 75 and 76 respectively.

Each of the flip flops as well as the AND and OR circuits are of conventional construction and preferably employ transistors. As is understood in the art a flip flop is a bistable device from which two output signal conditions, e.g. plus and minus voltage levels may be simultaneously derived, which output signal conditions reverse when the flip flops switch state. Switching from one stable state to the other i.e. from a reset to a set state is accomplished either by applying to one of the two inputs of the flip flop signals of alternating polarity, or to each input in turn signals of the same polarity.

In the static state all of the flip flops are in a reset state and their output terminals A and B assume the polarities indicated. The forward feed flip flop 66 when not clamped in a reset state is adapted to be set and reset by the negative and positive timing pulses 63 and 64 respectively generated each shaft cycle. Similarly the reverse feed flip flop 65 is adapted to be set and reset by positive 64 and negative 63 pulses. As shown in FIGURE 3 the timing pulses in the coil circuit drive an emitter follower 77 whose output is A.C. coupled to the set-reset terminals of the feed flip flops 65 and 66. When the reverse feed flip flop is set the feed magnet connected to its A output terminal is energized and when the forward feed flip flop is set the feed magnet connected to its B terminal is energized as will hereinafter appear. The B output terminals of both feed flip flops are A.C. coupled to an OR circuit 78 whose output is connected to the reset terminal of the feed control flip flop 67 such that when either the forward or reverse feed flip flop 65 or 66 is reset, as the case may be, the feed control flip flop 67 will also be reset.

One or the other of the forward or reverse feed flip flops is clamped in a reset state by the potential condition on terminal 81 which is connected directly to an OR circuit 82 and indirectly through an inverter 83 to an OR circuit 84. The output lines of the OR circuits 82 and 84 are connected respectively to the reverse and forward feed flip flops whereby depending on the polarity of the signals on terminal 81 one or the other of the feed flip flops will be clamped in its reset or static state. Both feed flip flops are also clamped in a reset state by the static signal condition on the A output terminal of the feed control flip flop which is connected over control line 85 to the inputs of the OR circuits 82 and 84. The A output terminal of the feed control flip flop 67 is also A.C. coupled to the reset terminal of the tape feed flip flop 68. The B output terminal of the feed control flip flop 67 is connected to the slave in process line 13 which assumes a negative potential when the flip flop is reset and a positive potential when it is set to indicate that the unit is in process.

With reference to FIGURE 3, assuming tape is being perforated, positive code signals on lines 11, with the exception of an 8 bit for reasons not pertinent herein, pass through OR gates 86 whose outputs as well as the 8 bit signal are connected to one input i.e. the emitters of associated PNP transistor AND gates 87. The other input lines to the AND gates 87 i.e. the base terminals are connected to the B output terminal of the forward feed flip flop 66 which as heretofore stated is also connected to the forward feed electromagnet 53 via a PNP transistor inverter 88. The outputs of the AND gates 87 are connected to associated data punch selector electromagnets 32. The B output terminal of the forward feed flip flop is also connected to one of the inputs of a PNP transistor AND gate 87 whose output is connected to the index punch electromagnet 32I. The other input to the index punch AND gate 87 is connected to ground through the tape tension switch 74 and the card detector switch 71 whereby if the tape tension switch is normal as shown, and the forward feed flip flop 66 is set, the index punch electromagnet 32I will draw current simultaneously with punch selector electromagnets 32 and forward feed electromagnet 53. The command or start process signal on line 12 whereby code signals on lines 11 are perforated in a record is A.C. coupled to the set terminal of the feed control flip flop 67 through an OR circuit 91. Another input to the OR circuit 91 is connected directly to one terminal of the eject switch 76 and via a blocking diode 92 to one terminal of the tape feed switch 75 whereby when either is closed ground potential will be applied to the OR circuit 91 which will thereby pass a set signal to the feed control flip flop 67. As shown, if the tape feed switch is closed ground potential is applied over line 93 to the set terminal of the tape feed flip flop 68 whose output terminal is connected to each of the OR circuits 86.

Referring now to FIGURE 4 there are shown timing curves to illustrate the operation of the instant apparatus at a 50 per second rate in response to a source also operable at a 50 per second free running rate. Such source units are disclosed in copending applications Serial No. 166,997 and 162,388. As shown in FIGURE 4 curve 94 represents the signal polarity on code lines 11 corresponding to the set-reset condition of the buffer flip flops in unit 7 selectively set by coded data emitted from a source unit 6. Curve 95 shows the active time of the start search and search complete signals to and from the source unit 6; curve 96 shows the active time of the start process signal generated by the system control circuitry 9 in response to the search complete signal. Curve 97 shows the positive and negative timing pulses 63 and 64 respectively. Curves 98 and 101 represent the polarities on output terminals B corresponding to the set-reset times of the feed control and forward feed flip flops respectively, curve 102 represents the current build up in the punch and forward feed electromagnets, curve 103 shows the intervals of punch motion superimposed on the curve 104 of the punch drive arm motion, curve 105 shows the intervals of feed motion superimposed on the cyclic curve 106 of the feed drive arm motion, and curves 107 and 108 show polarities with respect to time of a process complete and of a process complete delayed signal generated in the system timing and control circuitry in response to the signal on the B terminal of the feed control flip flop, the former serving to reset the buffer flip flops and the latter to initiate a start search signal.

With a record tape in the apparatus then, the index punch magnet AND gate 87 will be conditioned to pass a magnet energizing signal as its emitter terminal is connected to ground. As the control flip flop 67 is in its reset state output line 13 will be negative and a positive process complete signal condition (curve 107) will obtain in the system circuitry. This process complete signal condition (curve 107) will obtain in the system circuitry. This process complete signal condition will, if the source unit is turned on at time $t_0$, initiate a start search signal (curve 95) to the source in charge which, if a reader will automatically issue code signals and a search complete signal (curve 95), or if a keyboard will permit code signals and a search complete signal to issue therefrom when a key is depressed. Such a search complete signal will initiate a 7.5 millisecond start process signal at time $t_1$ (curve 96) which in turn will set the feed contron flip flop 67 (curve 98) whereby a slave in process signal condition will obtain on output line 13. This slave in process condition will reverse the state of the process complete signal thereby reversing the start search and search complete lines as well as the source output code lines; the code signals however will be stored in the buffer unit and lines 11 will remain energized. When the control flip flop 67 is set, the forward feed flip flop 66, assuming the proper polarity on terminal 81, will no longer be clamped in its reset state, whereby upon receipt of the first negative timing pulse 63 following the setting of the feed control flip flop 67, which occurs at time $t_2$, the forward feed flip flop 66 will be set as shown by curve 101 representing the output state of the B terminal of the forward feed flip flop. In the illustrated sequence, as the initial start process signal occurs after the negative pulse generated in the first shaft cycle, the forward feed flip flop 66 cannot be set in the first cycle. Hence the feed control flip flop 67 will not be reset in the first cycle nor will the buffers storing the code signals be reset. In the second cycle, the forward feed flip flop 66 set at time $t_2$ by the negative timing pulse 63 effects the energization of the index and selected data punch magnets and the forward feed magnets as shown by curve 102. As the feed magnet flux will be built up at the time $t_3$ that the feed drive arm is at its uppermost position, i.e. 225 degrees in the second cycle as illustrated by curve 106, the nose 51 of the feed armature engages the ratchet 44, and the feed drum 48 is incrementally moved over the interval $t_3$–$t_5$ corresponding to rotation of shaft 14 between 225 degrees and 325 degress as illustrated by curve 105. The data and index magnets reach a peak flux condition toward the end of the rightward movement of the punch drive arm i.e. 282 degrees shaft rotation such that the selected magnet armatures will be restrained as the drive arm moves toward the left in the interval between 300 degrees of the second and 120 degrees of the third cycle as illustrated by curve 104. At time $t_4$ corresponding to 323 degrees the selected pawls are committed by the springs 41 into engagement with the bell cranks 36 whereby punches 38 are driven into and retracted from the record medium over the interval $t_6$–$t_8$ corresponding to movement of shaft 14 between 5 and 227 degrees in the third shaft cycle. After the pawls are committed at time $t_4$ the positive timing pulse 64 resets the forward feed flip flop 66 which in turn resets the feed control flip flop 67 whereupon the slave in process line 13 will go negative and the process complete signal positive as shown by curves 98 and 107 respectively. The positive going leading edge of the process complete signal (curve 107) is operative to reset the buffers, and after a delay of approximately one millisecond (curve 108), sufficient to permit the buffers to reset, effects the initiation of another start search signal which, if a 50 per second reader is the source, will automatically effect the emission of data and a search complete signal at time $t_5$. The search complete signal will generate a subsequent start process signal at time $t_7$ which as shown in FIGURE 4 now occurs before the negative timing pulse in the third shaft cycle. In other words the 50 per second perforating unit is thereafter synchronized with the 50 per second source and will process data at the 50 per second rate as indicated in FIGURE 4.

As will be appreciated if the source is operable at a rate higher than the free running rate of the perforator unit the start process signals will, after synchronization with the mechanical cycle as described above, continue to be synchronized with the mechanical cycle i.e. they will occur before the negative timing pulses but in this case data will be processed at the free running rate of the perforator. Where the source is operable at a constant rate slower than the free running rate of the perforating unit or asynchronously at a slower rate, data will be processed asynchronously at a rate slower than the free running rate.

Reverse feed is similar to but 180 degrees out of phase with forward feed as the reverse feed flip flop is set and reset by positive and negative timing pulse respectively. Also since the output of the reverse flip flop is not connected to the punch AND gates, no data can be processed during reverse feed.

Referring again to FIGURE 3 the depression of the tape feed switch 75 will set the tape feed flip flop 68 as well as the control flip flop 67 via diode 92 and OR gate 91, and when the forward feed flip flop 66 is the one not clamped by terminal 81 all the AND gates 87 will conduct permitting tape to be cyclically fed and all the punches except the 8 bit punch to be cyclically operated for as long as switch 75 is held depressed. As before when the forward feed flip flop resets it will reset the control flip flop which in turn will reset the tape feed flip flop 68. When the reverse feed flip flop 65 is the one not clamped reverse feed only will occur.

The depression of the eject switch 76, if the forward feed flip flop is conditioned will cause the tape to feed forward and an index hole to be punched in similar fashion. If the reverse feed flip flop is conditioned, eject switch depression will effect reverse feed without the perforation of index holes.

When the tape tension switch is operated from normal the slave in process line 13 goes positive indicating an in-process condition with the result that the process complete signal reverses whereby no start search signal can issue to the source in charge.

Figure 5:
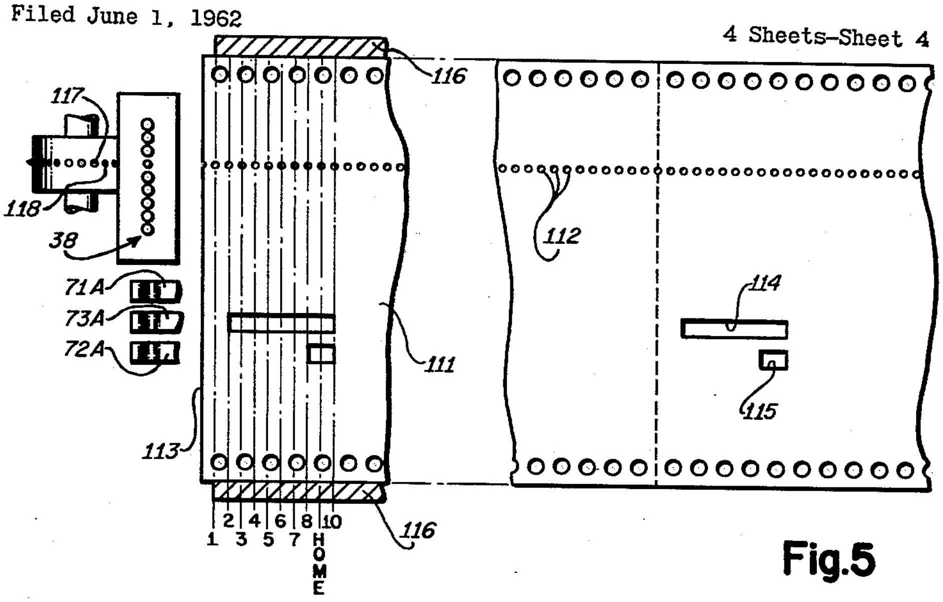
FIGURES 5 and 6 are top views showing a record card being loaded in the apparatus.

As indicated hereinbefore the apparatus is capable of handling tapes or cards 111. Individual or fanfolded cards may be employed. The cards are provided with index holes 112 with the lead edge 113 of each card presenting an open index hole. With reference to FIGURE 5 each card is provided with a card zone slot 114 which extends from card column two to ten and a card in position slot 115 which extends from column eight to column ten. Associated with the card switches are resilient switch contact arms 71A, 72A and 73A which are aligned with the column of punch elements 38 but laterally removed therefrom. The card detector switch arm 71A is adapted to be operated by the presence of the card thereover whereby the card detector switch 71 is moved to its card position (shown dotted in FIGURE 3). Similarly the card in position switch arm 72A when operated by the presence of a card thereover is adapted to close the card in position switch 72, and the card zone switch arm 73A when operated by the presence of a card thereover is adapted to open the card zone switch 73.

Figure 6:
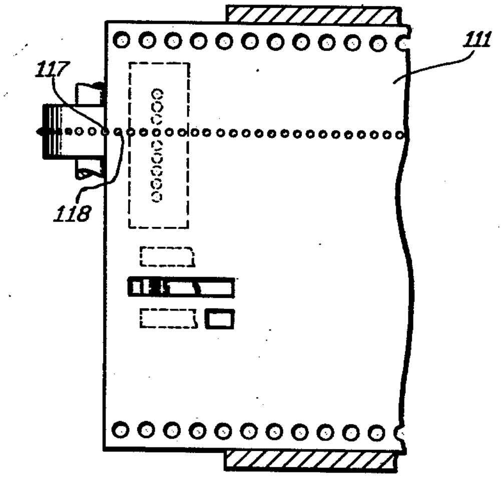

In operation, when a card is inserted into the record channel as far as it will go, card guides 116 being provided, the open index hole will encounter the sprocket pin 117 one increment from top center whereby when the feed drum rotates, the second sprocket pin 118 to the right of top center as viewed in FIGURES 5 and 6 will engage the column one index hole. As is apparent when the card has been inserted so that it lead index hole encounters index pin 117, the fourth card column will be over the punch elements as shown in FIGURE 6; the spacing being 5 columns between the punch elements and the sprocket pin at top center. In this position the card detector switch 71 is closed, thereby removing ground from the index AND circuit 87 whereby the index punch magnet is disabled. The closure of switch 71 simultaneously connects ground to one terminal of the card in position 72 and card zone switches 73. As the card zone slot is over its switch arm 73A the card zone switch 73 will be closed and a lamp 119 (FIGURE 3) will indicate the fact that the card is positioned in a zone immediately preceding a home position which in the illustrated card is column nine. Also as the card in position switch 72 is closed at this time ground is applied to one terminal of the eject switch therethrough. Depression of the eject switch at this time therefore will set control flip flop 67 and assuming the forward feed flip flop 66 is not clamped via terminal 81 it will be set and effect the energization of the forward feed magnet. The record will therefore be fed, providing the eject switch is held depressed, until the card in position slot moves over its switch arm 72A permitting it to open the card in position switch 72 which occurs during movement of card column nine to the punching station. Data may now be recorded in the lead card; it being noted that the card in position switch 72 will reclose and the card zone switch 73 will open as the tenth column moves beneath the printing station thereby extinguishing the lamp and enabling the eject switch once again whereby card movement can be effected to the home position in the next card.

When the amount of data comprising a message extends from a first card to and ends within the first eight columns of a second card, it is desirable that a following message start on a third card in the series. This requires that the eject switch be depressed twice as the first depression will only move the second card to its home position, i.e. column nine, at which time the card in position switch will open and will, as stated, disable the eject switch. In order to permit card movement until the card in position switch recloses i.e. during movement of the card from column nine to column ten, there is provided as shown in FIGURE 3 a capacitor 121 which charges to ground through a resistor 122 when the card in position switch opens. When the eject switch is reclosed then the charge on the capacitor will discharge through the eject switch thereby effecting movement of the second card to position 10 at which time the card in position switch recloses permitting continued feed movement until the home position in the third card is reached.

It should be understood that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. Apparatus for perforating records in accordance with code signal patterns in columns transverse the direction of movement of said records and in response to command signals generated with said code signal patterns comprising cyclically operable means, means for generating timing signals at predetermined times in each cycle of said cyclically operable means, record perforating elements, record feed means, feed electromagnet means operative when energized to couple said record feeding means to said cyclically operable means, perforating element electromagnet means selectable in response to code signals and operative thereafter when energized to couple selected perforating elements with said cyclically operable means, first bistable means settable in response to command signals, and second bistable means conditioned in response to the setting of said first bistable means for operation to set and reset state by said timing signals and adapted when set to energize said feed electromagnet and selected perforating element electromagnets, said first bistable means being reset when said second bistable means is reset.

2. Apparatus for perforating records in accordance with code signal patterns in columns transverse the direction of movement of said records and in response to command signals generated with said code signal patterns comprising cyclically operable means, a plurality of record perforating elements adapted to be selectively coupled to said cyclically operable means, record feed means adapted to be coupled to said cyclically operable means to effect columnar movement of said record, a control flip flop settable to its other than normal state in response to a command signal, a feed flip flop conditioned in response to and for operation over the interval, said control flip flop is in its other than normal state, a pulse generator coupled to said feed flip flop and responsive to said cyclically operable means for generating at predetermined times in a cycle a pair of spaced pulses respectively adapted to set and reset said conditioned feed flip flop at predetermined times in a cycle of said cyclically operable means, means operative when said feed flip flop is set to couple said record feed means to said cyclically operable means, means selectively conditioned in response to code signal patterns and operative when said feed flip flop is set to couple selected record perforating elements to said cyclically operable means, and means operatively connecting said feed flip flop and said control flip flop whereby when the former is reset the latter is reset.

3. Record perforating apparatus comprising cyclically operable means, means for generating set and reset pulses at predetermined times in each cycle of said cyclically operable means, a plurality of record perforating elements, record feed means, feed electromagnet means operative when energized to couple said feed means with said cyclically operable means, a first control flip flop, a second control flip flop, and a record feed flip flop, means for setting said first control flip flop and said record feed flip flop, and perforating element electromagnet means conditionable in response to the setting of said record feed flip flop and operative when energized to couple said perforating elements to said cyclically operable means, said second control flip flop being conditionable in response to the setting of said first control flip flop and operative thereafter to set and reset state in response to said set and reset pulses, said second control flip flop when set being operative to energize said feed electromagnet and said conditioned perforating element electromagnets, said first control flip flop and said record feed flip flop being reset when said second control flip flop is reset.

4. In a record processing apparatus comprising cyclically operable means, means for generating spaced set and reset pulses at predetermined times in each cycle of said cyclically operable means, record feed means, electromagnet means operative when energized to couple said record feed means to said cyclically operable means, a control flip flop, a feed flip flop, means for setting said control flip flop thereby conditioning said feed flip flop for operation in response to said set and reset pulses, said electromagnet being energized over the set interval of said feed flip flop, said control flip flop being reset in response to the resetting of said feed flip flop.

5. Record perforating apparatus comprising a free running shaft, means for generating spaced set and reset pulses at predetermined times in each shaft cycle, a feed actuator oscillatable between two limits in each shaft cycle, a punch element actuator oscillatable between two limits in each shaft cycle, a plurality of punch elements, a record feed element, first electromagnet means operative at a predetermined time in a cycle of shaft when energized to couple said feed actuator to said record feed means as said actuator is moving from one limit to its other limit, second electromagnet means selectable in response to code signals and operative when energized at a predetermined time in a cycle of said shaft to couple said punch element actuator to said punch elements as said punch element actuator is moved from one limit to the other, first bistable means settable in response to command signals generated at any time relative to said shaft cycle, and second bistable means conditionable when said first bistable means is set and operative thereafter to a set state in response to the first set pulse generated after it has been conditioned thereby energizing said first and selected second electromagnet means at said predetermined times in said shaft cycle to effect the coupling of said record feed means and punch elements to associated actuators, said first bistable means being reset in response to the resetting of said second bistable means, the reset state of said first bistable means permitting the release of subsequent code signals and a command signal.

6. Record perforating apparatus operable to perforate code patterns corresponding to code signal patterns in record columns transverse the direction of movement of a record and in response to command signals generated with said code signal patterns comprising continuously running cyclically operable means, means for generating set and reset pulses at predetermined times in each cycle of said cyclically operable means, a plurality of record perforating elements, record feed means, feed electromagnet means operative when energized to couple said feed means with said cyclically operable means, a first control flip, a second control flip flop conditionable in response to the setting of said first control flip flop and operative thereafter to set and reset state in response to said set and reset pulses, perforating element electromagnet means, and means responsive to code signals for conditioning selected perforating element electromagnet means, said first control flip flop being set by the command signal generated with said code signals, said conditioned second control flip flop when set being operative to energize said feed electromagnet means and said selectively conditioned perforating element electromagnet means, said first control flip flop being reset in response to the resetting of said second control flip flop.

7. Record perforating apparatus responsive to code signal patterns and to a command signal for perforating said code signal patterns in a record and for feeding said record comprising continuously driven cyclically operable means, means for generating in response to and at predetermined times in each cycle of said cyclically operable means set and reset pulses, a plurality of record perforating elements, perforating element electromagnet means, record feed means, forward and reverse feed electromagnet means operative when energized to couple said cyclically operable means to said record feed means thereby to effect forward and reverse feed respectively, a control flip flop, a forward feed flip flop operative when set to energize over its set interval said forward feed electromagnet and selected conditioned perforating element electromagnet means, a reverse feed flip flop operative when set to energize over its set interval said reverse feed electromagnet means, means normally enabling and disabling said forward and reverse feed flip flops respectively and responsive to a reverse signal for disabling and enabling said forward and reverse flip flops respectively, said control flip flop when set by a command signal being operative to condition the enabled feed flip flop for operation to set and reset states in response to said pulses, means responsive to code signals for conditioning selected perforating element electromagnet means, and means for resetting said control flip flop in response to the resetting of said feed flip flops.

References Cited in the file of this patent

UNITED STATES PATENTS

| | | |
|---|---|---|
| 2,997,231 | Perez | Aug. 22, 1961 |
| 3,064,882 | Levin | Nov. 20, 1962 |
| 3,069,075 | Sallach | Dec. 18, 1962 |
| 3,093,303 | Dicks | June 11, 1963 |